(No Model.)
S. A. STURGIS.
BICYCLE TRAINING DEVICE.
No. 581,835. Patented May 4, 1897.
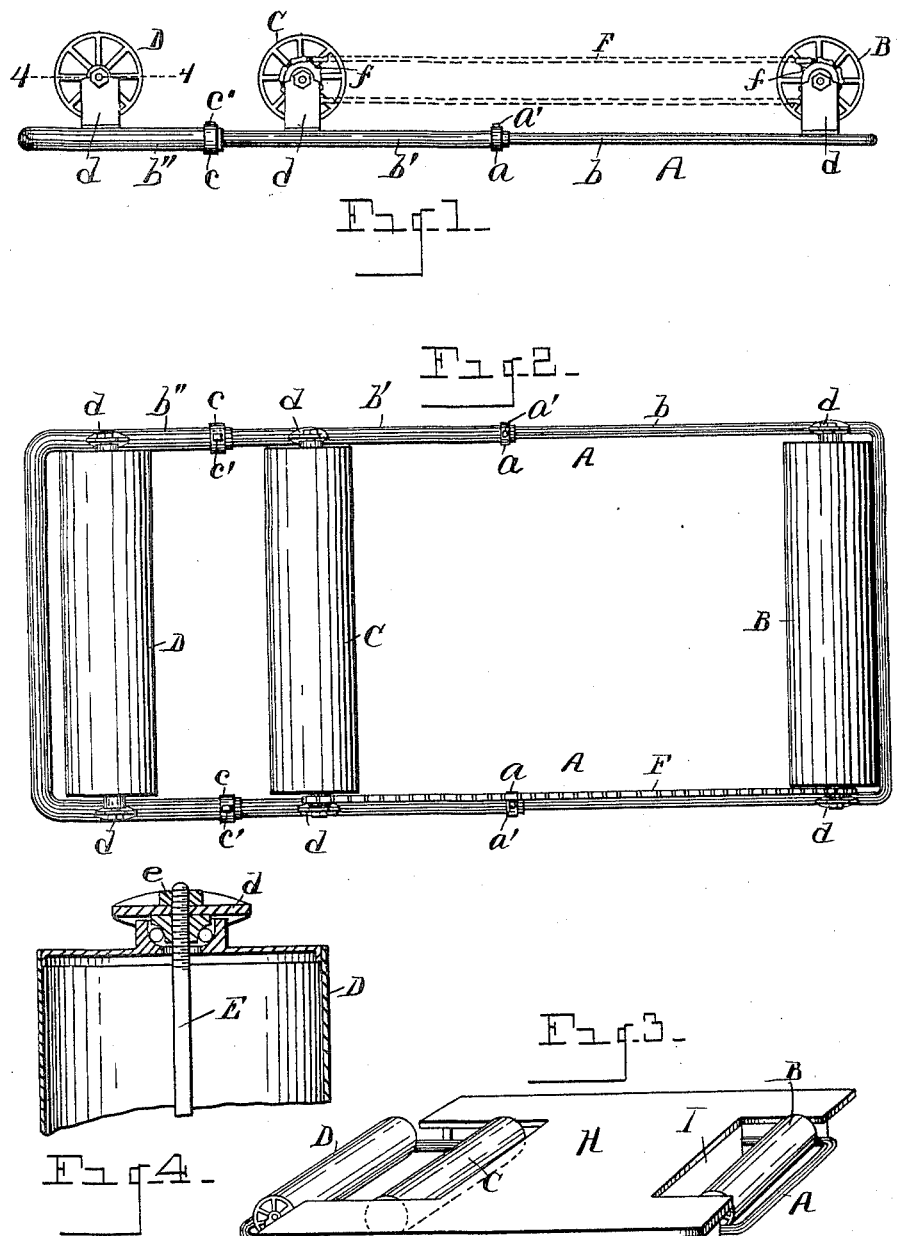
WITNESSES
O. B. Baenziger
Mary A. Martin
INVENTOR
Samuel A. Sturgis
BY R. B. Wheeler & Co.
ATTORNEYS

UNITED STATES PATENT OFFICE.

SAMUEL A. STURGIS, OF ST. JOHN'S, MICHIGAN.

BICYCLE TRAINING DEVICE.

SPECIFICATION forming part of Letters Patent No. 581,835, dated May 4, 1897.

Application filed April 18, 1896. Serial No. 588,181. (No model.)

*To all whom it may concern:*

Be it known that I, SAMUEL A. STURGIS, a citizen of the United States, residing at St. John's, in the county of Clinton and State of Michigan, have invented a new and useful Home Trainer, of which the following is a specification.

This invention relates to new and useful improvements in bicycle home trainers; and it consists in the construction and arrangement of parts hereinafter fully set forth, and pointed out particularly in the claim.

The object of the invention is to provide a training device upon which a bicycle can be ridden and retained in an upright position either with or without support, enabling the rider to attain the same conditions as in track or road riding, where the bicycle remains stationary except in the revolution of the wheels, the arrangement of the device being such as to enable the rollers to be adjusted to accommodate various diameters of wheels and various lengths of wheel-base. This object is attained by the mechanism illustrated in the accompanying drawings, in which—

Figure 1 is a side elevation of my improved training device. Fig. 2 is a plan view of Fig. 1. Fig. 3 is a perspective showing removable platform which serves to assist the rider in mounting and dismounting. Fig. 4 is an enlarged section through the ball-bearing of one of the rollers.

Referring to the letters of reference, A designates the roller-supporting frame, which consists of three telescopic sections $b$ $b'$ $b''$, respectively. This frame is substantially rectangular in form and is made of tubing, the end sections $b$ and $b''$ being bent at right angles to form the corners of the frame. The tubing of the section $b$ is of such diameter as to enter the tubing of section $b'$, and is secured and made adjustable therein by means of the embracing-collars $a$, having the set-screws $a'$. The tubing of the section $b'$ is of such diameter as to enter the section of the tubing $b''$ and is in like manner secured therein by the collars and set-screws $c$ $c'$, respectively. By means of this construction a very light and stiff frame is provided, and one which is capable of any degree of longitudinal adjustment required.

It will be seen that section $b$ carries the forward roller B, that section $b'$ carries the center roller C, and that section $b''$ carries the rear adjacent roller D, by which means the rollers C and D may be adjusted with respect to each other and the roller B with respect to the rollers C and D.

It is designed that the rear or driving wheel of the bicycle shall rest upon the rollers C and D, bearing equally upon each, and that the forward wheel of the bicycle shall rest upon the forward roller B. It will therefore be seen that the rollers C and D must necessarily be adjustable with respect to each other to accommodate various diameters of wheels, and that the forward roller B must be adjustable with respect to the other rollers to accommodate various lengths of wheel-base.

Each of the rollers is provided with an axle E, passing longitudinally therethrough, the opposite ends of which are supported in the uprights $d$, secured to the frame, and are secured therein by the set-nuts $e$. The rollers are journaled on their respective axles by means of suitable ball-bearings, as shown in Fig. 4.

Upon the outer ends of the rollers B and C are suitable sprocket-wheels $f$, over which passes a sprocket-chain F, whereby said rollers are connected and caused to rotate in unison.

In operating this device the rear or driving wheel of the bicycle is placed upon the rollers C and D and the forward wheel upon the roller B, as before described. The operator then mounts the bicycle, and by driving the machine the rear roller C, being in contact with the driving-wheel, is caused to rotate and impart motion to the forward roller B through the sprocket-chain F, whereby both wheels of the bicycle are caused to revolve, enabling the rider to retain his position and maintain the equilibrium of the bicycle as readily as though riding upon the road.

By changing the distance between the rollers C and D, upon which the driving-wheel of the bicycle rests, resistance to the propelling of the machine may be increased or decreased at pleasure, so that the operator may have riding that will correspond with roadwork or trackwork at will. This adjustable feature of the various sections of the frame carrying the respective rollers also enables the tension of the driving-chain F to be regulated as required.

To provide for mounting the machine and dismounting therefrom, I employ a platform H, having central openings at each end, through which the rollers of the trainer project, and having vertical supports I, which sustain the platform in the center between the tubing of the frame A and at the outer ends upon each side as well, by which means the rider may readily mount the machine when in position upon the trainer and easily dismount therefrom.

Having thus fully set forth my invention, what I claim as new, and desire to secure by Letters Patent, is—

In a bicycle home trainer, the combination of the sectional telescopic frame consisting of three sections composed of hollow tubing adapted to slide one into the other, means for locking said sections when adjusted, the series of three rollers two of which are journaled approximate, one each in the rear and central sections of the frame, the third roller being journaled in the forward section of the frame, and the sprocket chain or belt connecting said forward roller with one of the rear rollers.

SAMUEL A. STURGIS.

Witnesses:
P. E. WALSWORTH,
H. B. WASHBURN.